(12) United States Patent
Perie

(10) Patent No.: US 7,717,554 B2
(45) Date of Patent: May 18, 2010

(54) RIMLESS EYEGLASSES HAVING SIDE BRANCHES ESSENTIALLY OF WIRE STRUCTURE

(75) Inventor: Jean-Claude Perie, Montauban (FR)

(73) Assignee: Minima, Linas (FR)

( * ) Notice: Subject to any disclaimer, the term of this patent is extended or adjusted under 35 U.S.C. 154(b) by 38 days.

(21) Appl. No.: 12/297,655

(22) PCT Filed: Apr. 5, 2007

(86) PCT No.: PCT/FR2007/000577
§ 371 (c)(1),
(2), (4) Date: Oct. 20, 2008

(87) PCT Pub. No.: WO2007/125184
PCT Pub. Date: Nov. 8, 2007

(65) Prior Publication Data
US 2009/0174861 A1    Jul. 9, 2009

(30) Foreign Application Priority Data
Apr. 20, 2006    (FR)    ................... 06 03493

(51) Int. Cl.
*G02C 1/00*    (2006.01)
(52) U.S. Cl. ........................ 351/110; 351/118
(58) Field of Classification Search .............. 351/110, 351/111, 118, 41, 158
See application file for complete search history.

(56) References Cited

U.S. PATENT DOCUMENTS

| | | | |
|---|---|---|---|
| 5,042,933 A | 8/1991 | Lear | |
| 5,585,870 A | 12/1996 | Masunaga | |
| 5,748,280 A * | 5/1998 | Herman | 351/110 |
| 5,880,807 A * | 3/1999 | Devercelli | 351/106 |
| 6,439,717 B2 | 8/2002 | Weber | |
| 6,447,517 B1 | 9/2002 | Bowman | |
| 6,860,597 B2 | 3/2005 | Carlon | |
| 7,073,903 B2 | 7/2006 | Rapp | |
| 7,264,348 B2 | 9/2007 | Perie | |

(Continued)

FOREIGN PATENT DOCUMENTS

EP    1107042 A    6/2001

(Continued)

OTHER PUBLICATIONS

International Search Report for PCT/FR2007/000577 dated Sep. 4, 2007.

*Primary Examiner*—Hung X Dang
(74) *Attorney, Agent, or Firm*—McCormick, Paulding & Huber LLP

(57) ABSTRACT

The invention relates to rimless eyeglasses comprising a bridge (13) interconnecting two lenses (V), and two side branches (11) connected to respective side zones of the corresponding lenses (V). In accordance with the invention, each side branch (11) essentially presents a wire structure comprising two main portions (11.1, 11.2) extending towards the rear or said branch, said main portions extending forwards, passing through two through holes (21, 22) in the lens (V), and being connected together in the vicinity of the front face of said lens by a front portion (11.3), a flexible bushing (15) being interposed in each through hole (21; 22) in order to clamp the associated main portion (11.1; 11.2) so as to hold the side branch (11) in place on the corresponding lens (V).

22 Claims, 7 Drawing Sheets

U.S. PATENT DOCUMENTS

| | | |
|---|---|---|
| 2003/0058401 A1 | 3/2003 | Preutz |
| 2004/0051843 A1 | 3/2004 | Carlon |
| 2005/0041198 A1 | 2/2005 | Rapp et al. |

FOREIGN PATENT DOCUMENTS

| | | |
|---|---|---|
| EP | 1382988 A | 1/2004 |
| FR | 2723649 A3 | 2/1996 |
| FR | 2862390 A1 | 5/2005 |
| WO | 8101749 A1 | 6/1981 |
| WO | 9605535 A | 2/1996 |
| WO | 0026716 A | 5/2000 |
| WO | 0221193 A | 3/2002 |
| WO | 02095481 A | 11/2002 |
| WO | 02095482 A | 11/2002 |
| WO | 03014804 A | 2/2003 |
| WO | 2004003632 A | 1/2004 |
| WO | 2006027428 A | 3/2006 |

* cited by examiner

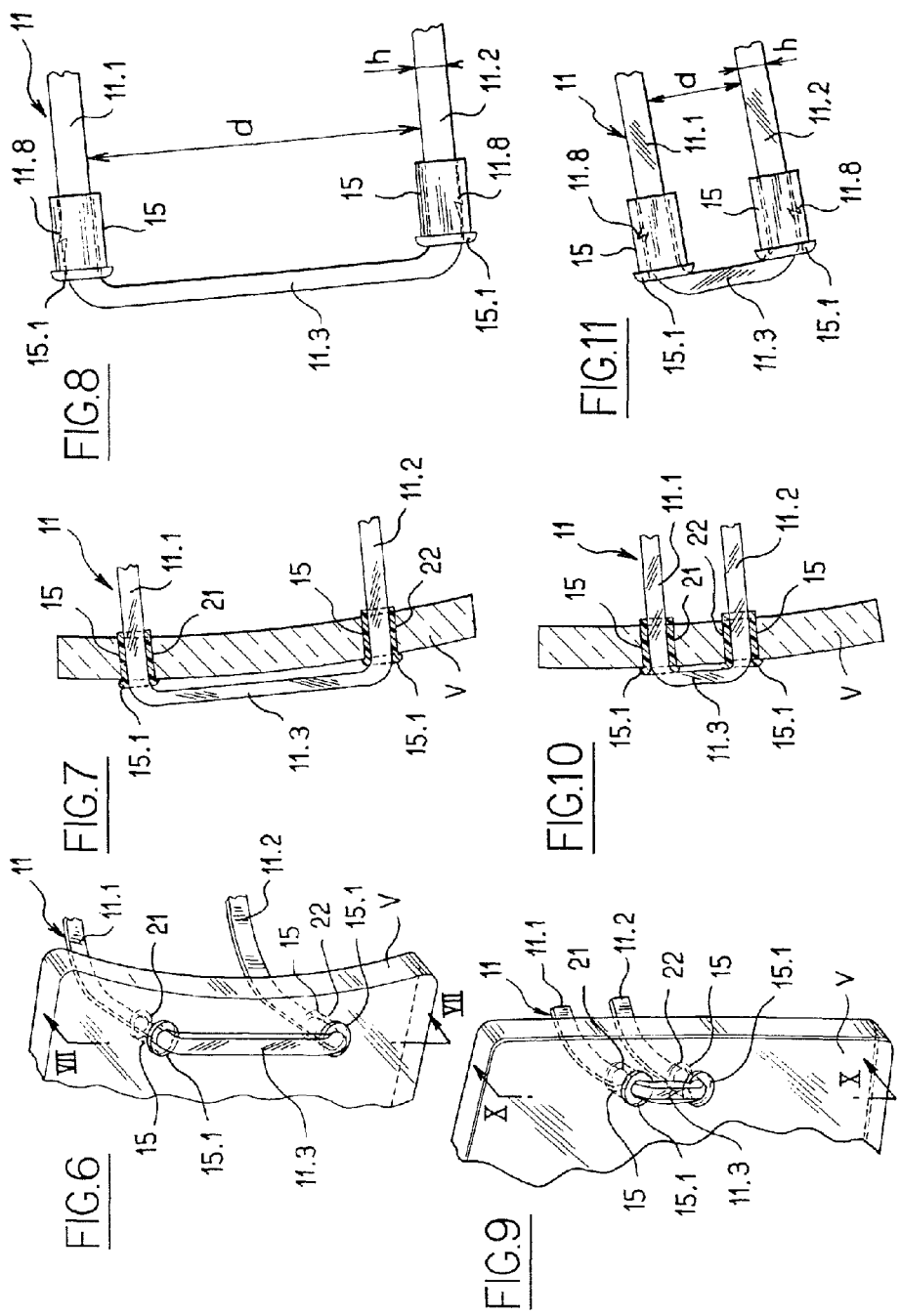

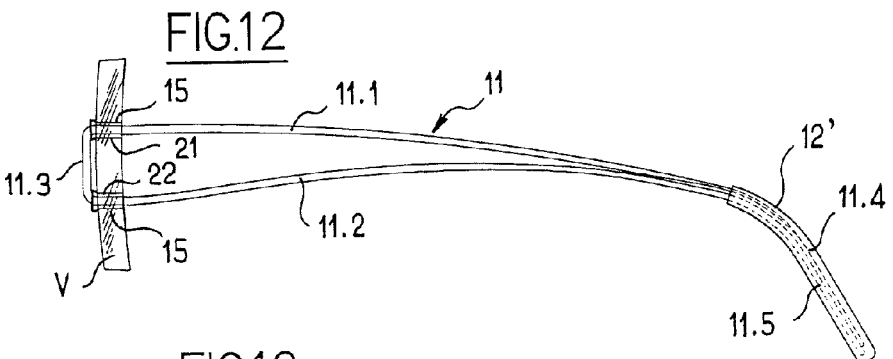
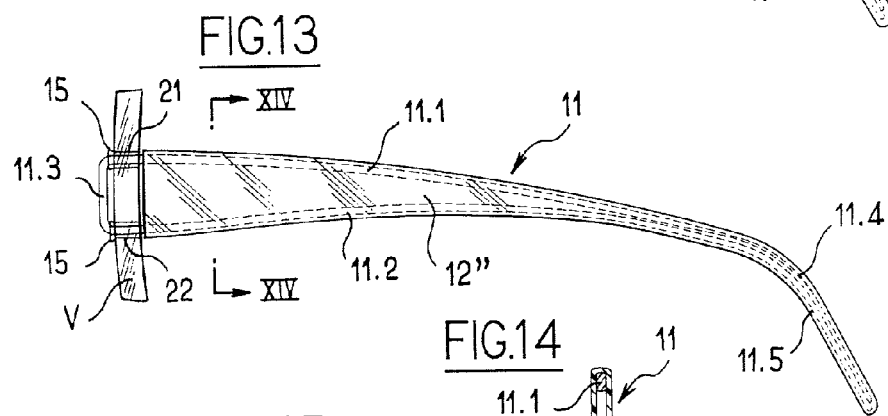
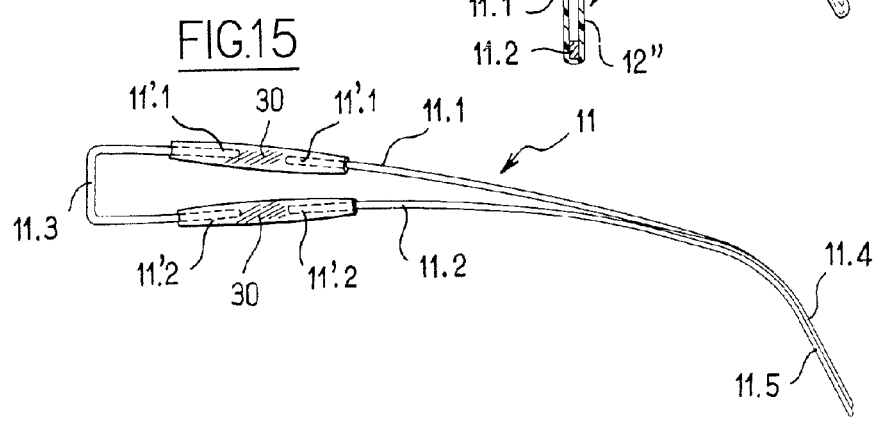
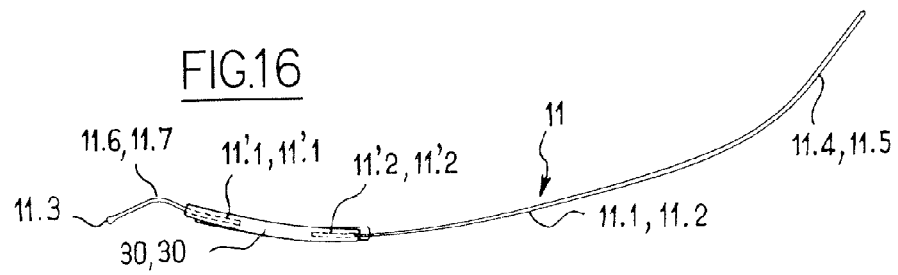

RIMLESS EYEGLASSES HAVING SIDE BRANCHES ESSENTIALLY OF WIRE STRUCTURE

CROSS REFERENCE TO RELATED APPLICATIONS

This application is entitled to the benefit of and incorporates by reference essential subject matter disclosed in International Patent Application No. PCT/FR2007/000577 filed on Apr. 5, 2007 and French Patent Application No. 0603493 filed on Apr. 20, 2006.

FIELD OF THE INVENTION

The present invention relates to the field of rimless type eyeglasses comprising a bridge interconnecting the two lenses and two side branches or "temples" connected to respective side zones of the corresponding lenses.

BACKGROUND OF THE INVENTION

Rimless eyeglasses, also known as drilled-lens glasses due to the holes formed through the thickness of the lenses for fastening the frame, are becoming more and more widespread.

Reference can be made in particular to the following documents: WO 2004/003632 A, WO 02/21193 A, EP 1 107 042 A, WO 96/05535 A, U.S. Pat. No. 6,447,517 A, U.S. Pat. No. 5,042,933, US 2003/0058401, WO 00/26716 A, EP 1 382 988 A, WO 03/014804 A, WO 02/095482 A, WO 02/095481 A, and WO 81/01749 A.

In the above-mentioned arrangements, two holes or else one hole and an open notch in the side, are provided for each element constituting the frame, i.e. the bridge and each of the side branches.

In most circumstances, the fastening ends of the side branches are of a configuration that is complex, with multiple bends, thus implying a fabrication cost that is high. Furthermore, it is sometimes necessary to perform such bending in situ, after threading an end of the branch through a hole in the lens while said end was still rectilinear and had yet to be bent, as shown in document US A 2004/0051843, which is particularly inconvenient for the operator.

Reference can also be made to document FR 2 723 649 A which describes a wire frame having tenons comprising two superposed branches passing through the lenses from front to back, by passing through associated holes. The ends of those branches that project rearwards from the lenses receive protective caps that are secured by adhesive.

More recently, the Applicant has proposed a frame arrangement in which the wire structure is very simple, thereby making it convenient and fast to assemble with the lenses, not requiring any special tooling, and likewise without the fastening of the frame on the lenses leading to any risk of the corresponding zone of the lenses being weakened, in particular as a result of excessive clamping, as described in document WO 2006/027428 A. The wire structure in question has single-wire side branches that are terminated by J-shaped distal ends, with a long portion passing through a through hole in the lens having a flexible clamping bushing interposed therein, and with a short anti-rotation portion turned rearwards and passing through an open notch in the side or through another hole in the lens, but without clamping the lens between said long portion and said short portion.

SUMMARY OF THE INVENTION

The present invention seeks to provide eyeglasses of the rimless type that provide better performance both in terms of complexity of structure and in convenience of assembly, compared with the above-mentioned prior art frames, and while conserving the minimal approach taught in above-mentioned document WO 2006/027428 A in the name of the Applicant.

In accordance with the invention, this problem is solved by rimless eyeglasses comprising a bridge interconnecting two lenses, and two side branches connected to respective side zones of the corresponding lenses, wherein each side branch essentially presents a wire structure comprising two main portions extending rearwards from the lens and meeting at the rear end of said branch, said main portions extending forwards, passing through two through holes in the lens, and being connected together in the vicinity of the front face of said lens by a front portion, a flexible bushing being interposed in each through hole in order to clamp the associated main portion so as to hold the side branch in place on the corresponding lens.

In particular, the two main portions forming each side branch are superposed, passing via two through holes in the lens that are superposed, the front portion of said side branch then extending vertically. In a variant, these main portions forming each side branch may be juxtaposed, passing via two through holes in the lens that are juxtaposed, the front portion of said side branch then extending horizontally or in an oblique direction.

In a first embodiment, each side branch is constituted by a single piece of metal that is deformable in bending without a hinge, and having its two free ends meeting in an element fitted thereon. This is advantageous insofar as it is then possible to assemble the side branches very quickly on the lenses merely by threading them through the two through holes in the lenses.

The fitted element is then advantageously a semirigid sleeve in which the two free ends of the side branch are embedded, or it is a flexible sheath clamping together the two free ends of the side branch. In particular, the flexible sheath may extend forwards as far as the rear face of the corresponding lens so as to cover the two superposed main portions forming the side branch. Provision could also be made for the flexible sheath to be made of heat-shrink plastics material, and for it to be heat-shrunk on the portions concerned of the side branch.

In accordance with another embodiment, the two main portions of each side branch are interrupted by a hinge-forming element.

Provision can then be made for the hinge-forming element to be a flexible block belonging to each main portion, with the interrupted ends of said main portion being embedded therein. In a variant, the block could be a flexible block common to both main portions, with the interrupted ends of said main portions being embedded therein.

The two main portions are then advantageously connected together by a unitary rear portion, or indeed they meet in an element that is fitted thereon, such as a sleeve or a flexible sheath.

Provision could also be made for the two main portions of each side branch to be spaced apart by a distance (d) that decreases continuously going rearwards away from the lens. In a variant, the two main portions of each side branch are spaced apart by a distance (d) that is essentially constant going rearwards away from the lens. The distance at the rear face of the lens then advantageously lies essentially in the range 4h to 20h, where h is the height or the diameter of the wire element constituting the main portions.

Preferably, the main portions of each side branch are made from a metal wire that is flattened in a vertical plane behind the lens so as to increase the flexibility of said side branch in the directions in which the side branch is folded.

Each main portion then advantageously presents at least one spike projecting from its portion that passes through the associated through hole in the lens, said at least one spike becoming anchored in the flexible clamping bushing when said main portion is in place, and/or said main portion extends away from the lens in rectilinear manner over a distance that is not less than the thickness of the lens, to a permanent bend that forms an obtuse angle with the fraction of said portion that extends beyond said distance.

Provision can also be made for the metal wire constituting the front portion of each side branch to be likewise flattened, but in the plane of the front face of the lens. In particular, the metal wire is a titanium wire having a round section that is locally flattened in its front portion.

Finally, each flexible clamping bushing is a fitting that is advantageously inserted in the corresponding hole in the lens, said bushing presenting a collar at its front end that comes to bear against the front face of the lens.

Other characteristics and advantages of the invention appear more clearly in the light of the following description and the accompanying drawings that show a preferred embodiment.

BRIEF DESCRIPTION OF THE DRAWINGS

Reference is made to the figures of the accompanying drawings, in which:

FIG. 6 is a fragmentary perspective view on a larger scale showing more clearly the connection zone of a side branch;

FIG. 7 is a section view on VII-VII of FIG. 6 and

FIG. 8 is a fragmentary elevation view of the front portion of the side branch with its flexible clamping bushings put into place;

FIGS. 9, 10, and 11 correspond respectively to FIGS. 6, 7, and 8 (FIG. 10 being a section on X-X of FIG. 9), and they show a variant embodiment in which the superposed main portions constituting each side branch are spaced apart by a small distance;

FIG. 12 is a side view showing a variant in which the rear covering sleeve is replaced by a flexible sheath;

FIG. 13 shows a variant of the preceding embodiment, in which the sheath is extended forwards as far as the lens, so as to constitute a cover, FIG. 14 being an associated section on line XIV-XIV of FIG. 13;

FIGS. 15 and 16 are respectively a side view and a plan view showing a variant in which the main portions of each side branch are interrupted by a hinge element, in this example constituted by respective flexible blocks associated with each main portion;

DETAILED DESCRIPTION OF THE PREFERRED EMBODIMENT

Figure 1:
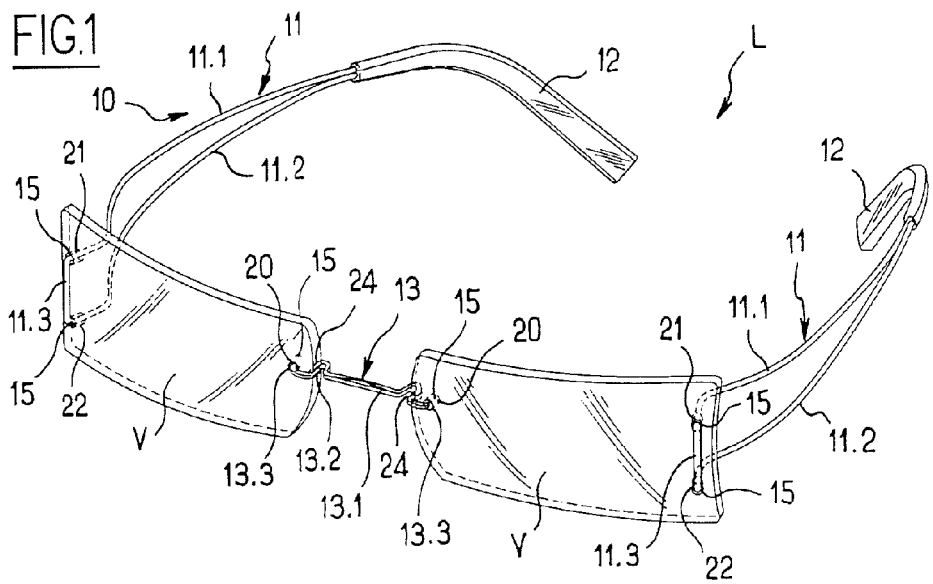
FIG. 1 is a perspective view of rimless-type eyeglasses in accordance with the invention.
Figure 2:
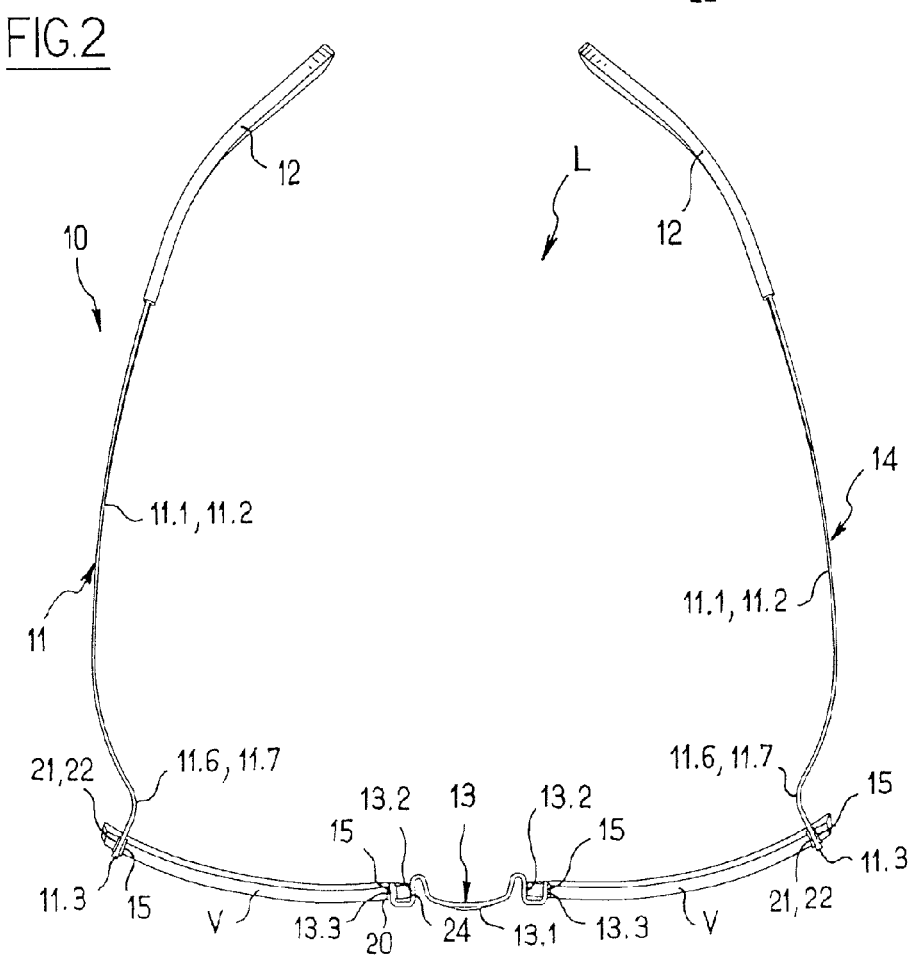
FIG. 2 is a plan view of the above-mentioned eyeglasses, in which view the connection ends of the side branches can be seen by transparency.

As shown in FIGS. 1 and 2, the invention relates to eyeglasses L of the rimless type. These eyeglasses have two lenses V and a frame 10 comprising a bridge 13 interconnecting the two lenses V, and two side branches 11 connected to respective side zones of the corresponding lenses V.

Each side branch 11 essentially presents a wire structure comprising two main portions 11.1, 11.2, superposed in this example, extending from the back of the lens V and meeting at the rear end of said branch, specifically in a semirigid sleeve 12. The main portions 11.1, 11.2 of each side branch 11 also extend forwards, passing through two through holes 21, 22 in the lens V, which holes are superposed in this example, and the main portions are connected together in the vicinity of the front face of said lens via a front portion referenced 11.3. Specifically, this front portion extends vertically. A flexible bushing 15 is also interposed in each through hole 21, 22 so as to fit tightly on the associated main portion 11.1, 11.2 and ensure that the side branch 11 is held firmly in place attached to the corresponding lens V.

Thus, such an arrangement enables two clamping points, superposed in this example, to be obtained in the vicinity of the through holes 21, 22 by virtue of the flexible bushings 15 interposed therein. The clamping that is provided is sufficient to ensure that each side branch 11 is held in place on the corresponding lens V without any need to provide some other, optionally separate, fastener member. The anti-rotation function is also ensured at each of the through holes, so it is certain there will be no movement of the side branches leading to them pivoting about an axis perpendicular to the plane of the lens.

Figure 21:
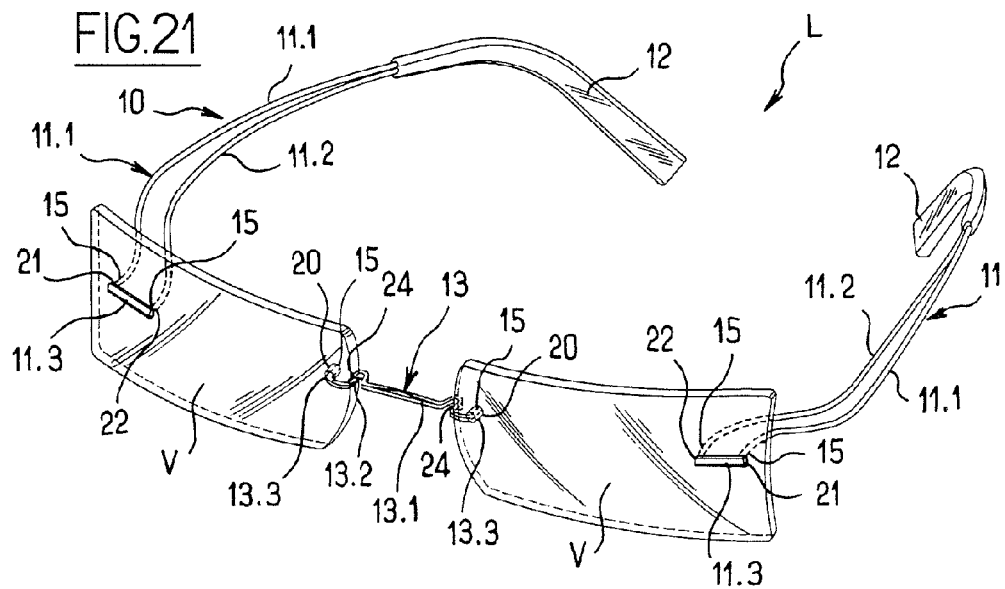
FIG. 21 is a perspective view of a variant of the preceding embodiments, in which the main portions of each side branch are no longer superposed, but are juxtaposed (horizontally in this example)
Figure 22:
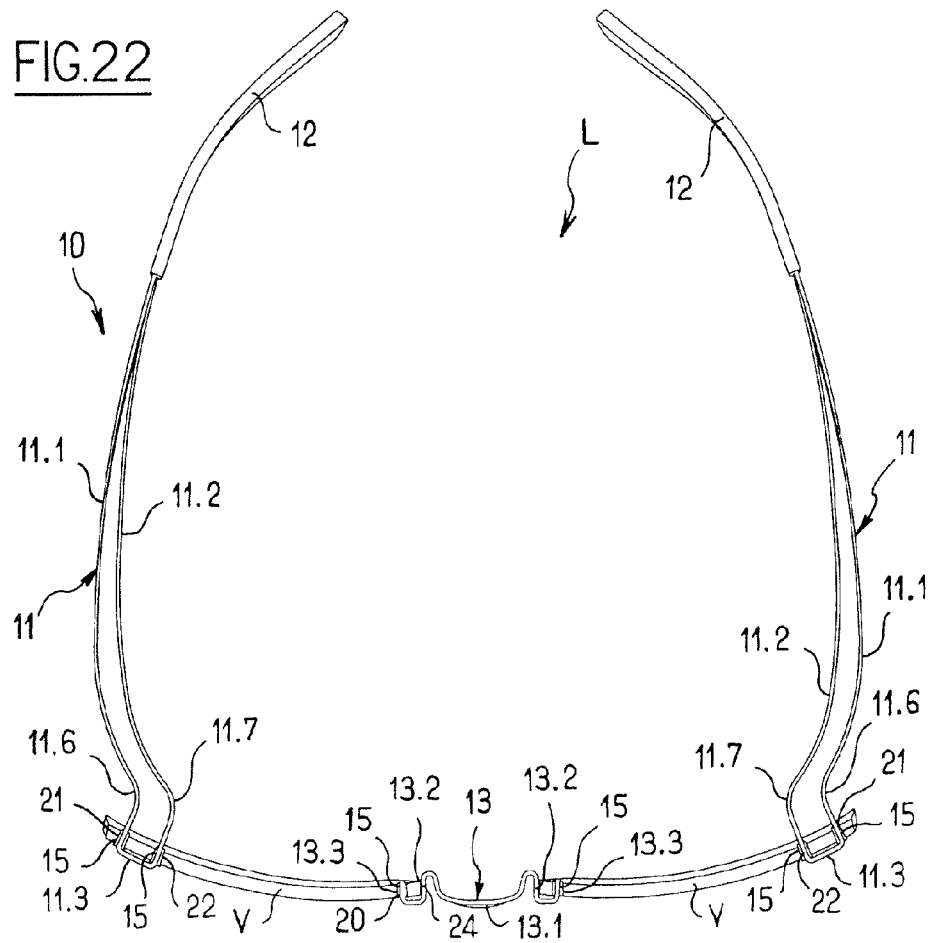
FIG. 22 is a plan view of the eyeglasses of FIG. 1, in which view the connection ends of the side branches can be seen by transparency.

As explained below, the associated through holes 21 and 22 of the lenses V need not be superposed, they could be juxtaposed, with the front portion 11.3 of each side branch then extending not vertically but horizontally (as shown in FIGS. 21 and 22), or in an oblique direction (variant not shown).

The bridge 13, likewise of wire structure, is of conventional design, with a curved main portion 13.1 and fastening side ends 13.2 and 13.3 that co-operate with a hole 20 and an open notch 24 in the side of the corresponding lens V for the connection between the bridge and the two lenses. The fastening portions of the bridge, which fasten to the corresponding zone of the lens merely by elasticity can thus be distinguished. Provision is also made for the ends of the bridge that pass through a through hole 20 to have a flexible clamping bushing 15 analogous to the superposed bushings used for holding each of the side branches 11. Naturally, it is possible to provide a bridge of some other structure, in particular one arranged to carry nose pads.

Figure 3:
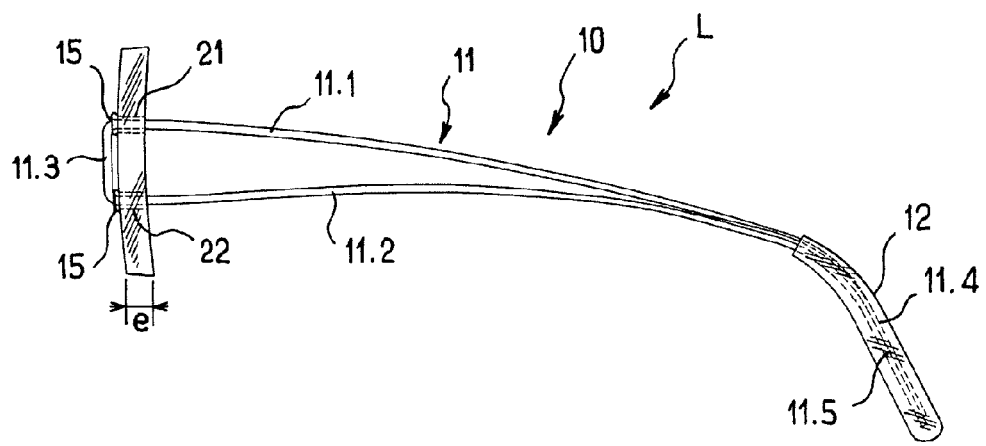
FIG. 3 is a side view of the above-mentioned eyeglasses, in which view the connection ends of the visible side branch can likewise be seen by transparency.
Figure 4:
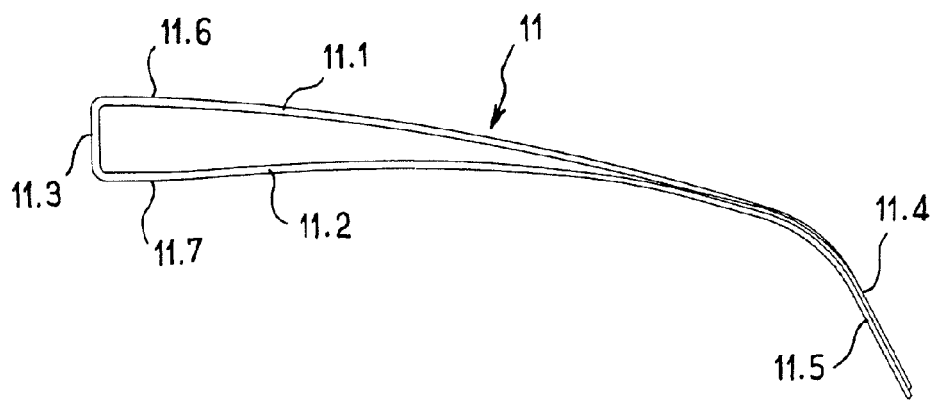
FIG. 4 is an elevation view of a side branch of the above-mentioned type, without its rear covering sleeve.
Figure 5:
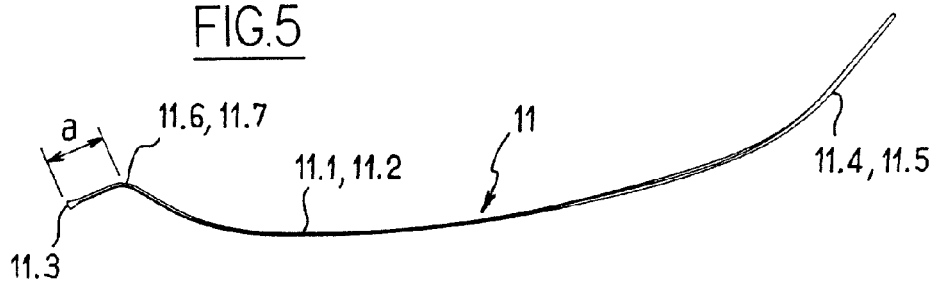
FIG. 5 is a plan view of said side branch.

Specifically, each side branch 11 is made from a single piece of metal that is deformable in bending without any hinges. As can be seen more clearly in FIGS. 3, 4, and 5, this provides the structure that is particularly simple for the side branches 11, each comprising a single metal part with two free ends, referenced 11.4 and 11.5, which ends meet in an element that is fitted onto the ends, specifically a semirigid sleeve 12 in which these free ends 11.4 and 11.5 are embedded. In this embodiment, each main portion 11.1, 11.2 extends from the back of the lens V in rectilinear manner over a distance written a that is not less than the thickness e of the lens V, to a respective permanent bend 11.6, 11.7 that forms an obtuse angle with the fraction of said portion that extends beyond said distance. The presence of this fraction that is rectilinear over a distance a is useful while putting the side branch 11 into place through the associated lens V, with this operation being described below with reference to FIG. 23.

The larger-scale views of FIGS. 6, 7, and 8 show more clearly the metal wire structure constituting the main portions 11.1, 11.2 and the front portion 11.3 of each side branch 11. The main portions 11.1, 11.2 are thus made from a metal wire that is flattened in a vertical plane behind the lens V so as to increase the flexibility of the side branch 11 in the directions in which it is moved. The wire is preferably a titanium wire of section that is initially round and that is flattened locally in its front fraction. It can also be seen that the metal wire constituting the front portion 11.3 of each side branch 11 is flattened, but in the plane of the front face of the lens V. This serves in particular to reduce the extent to which the front portion 11.3 projects in front of the lens in question. Because of the presence of two perpendicular planes for the flattened zones, i.e. firstly the common vertical plane of the flattened zones in the main portions 11.1, 11.2, and secondly the vertical plane of the front portion 11.3, a zone in which the wire is twisted is to be found at each of the connection bends, i.e. at the outlet of the through holes 21, 22 beyond the interposed bushings 15.

In this respect, it should be observed that each flexible clamping bushing 15 that comes from a fitting inserted in the corresponding hole 21, 22 of the lens V presents a collar 15.1 at its front end, which collar comes to bear against the front face of the lens V, thereby providing a maximum engagement abutment when putting the side branch 11 into place by sliding the main portions 11.1, 11.2 thereof, and thus avoiding any direct contact between the inside face of the flat front portion 11.3 and the front face of the lens V.

It is also advantageous to provide for each main portion 11.1, 11.2 to present at least one projecting spike from its fraction that passes through the associated through hole 21, 22 in the lens V, which spike can anchor in the flexible clamping bushing 15 when said main portion is in place. Specifically, and as can be seen more clearly in FIG. 8, a spike is provided that forms a barb 11.8 on the top edge of the main portion 11.1 and on the bottom edge of the main portion 11.2.

To put the side branch 11 into place in the associated lens V, it is preferable to fit each main portion 11.1, 11.2 with its flexible clamping bushing 15, as shown in FIG. 8, said sleeve penetrating into the associated through hole in the lens towards the end of sliding the wire through the hole, and becoming strongly jammed when the spike 11.8 arrives in said hole.

In FIG. 8, reference d designates the distance between the two main portions 11.1 and 11.2 of each side branch 11. This distance d could naturally vary depending on the shape desired for the side branches 11. Nevertheless, mechanical necessities generally imply choosing a distance d that lies essentially in the range 4h to 20h, where h is the height or the diameter of the wire element constituting the main portions 11.1 and 11.2.

FIGS. 9, 10, and 11 thus show a variant of the above-described embodiment in which the distance d is much shorter than in the above-described embodiment, with the component metal wire presenting the same height $\underline{h}$.

Thus, with a metal wire initially having a round section of diameter 0.9 millimeters (mm), giving rise to a height $\underline{h}$ of 1.38 mm and a thickness of 0.5 mm in the flattened zones, it is possible to select a distance d lying essentially in the range 5 mm to 20 mm.

In the embodiments described above, the distance d decreases continuously going rearwards away from the lens V. Nevertheless, this is merely an example and, as explained below, it is possible for the two main portions 11.1, 11.2 of each side branch 11 to be spaced apart by a distance d that remains essentially constant going rearwards away from the lens V.

FIG. 12 shows a variant in which the semirigid sleeve 12 associated with embedding the two free ends 11.4 and 11.5 of the side branch 11 is replaced by a flexible sheath 12', each made of rubber, clamping the two free ends 11.4 and 11.5 of the side branch 11 together.

As shown in FIGS. 13 and 14, provision can be made for the above-described flexible sheath, here given reference 12", to extend forwards as far as the rear face of the corresponding lens V, so as to cover both superposed main portions 11.1 and 11.2. Under such circumstances, the main portions 11.1 and 11.2 form reinforcement for the sheath 12" (more clearly visible in the section of FIG. 14), thus giving the impression of a solid side branch. In FIGS. 12 and 13, it can be advantageous to select a flexible sheath 12', 12" that is made of a heat-shrink plastics material so that the said sheath can be heat-shrunk onto the corresponding portions of the side branch 11 with appropriate clamping force and without sliding rearwards along the side branch, and without rolling the rear wire fractions one over the other.

In all of the embodiments described above, each side branch 11 is constituted by a single piece of metal that is deformable in bending without any hinge, however provision could be made in a variant for the two main portions 11.1, 11.2 of each side branch 11 to be interrupted by a hinge-forming element, as shown in FIGS. 15 to 20.

FIGS. 15 and 16 show an embodiment in which the hinge element is a flexible block 30 specific to each of the main portions 11.1, 11.2, with the interrupted ends 11'.1, 11'.2 of said main portion being embedded therein. As above, the distance between the superposed main portions 11.1, 11.2 decreases going rearwards away from the lens V.

Figure 17:
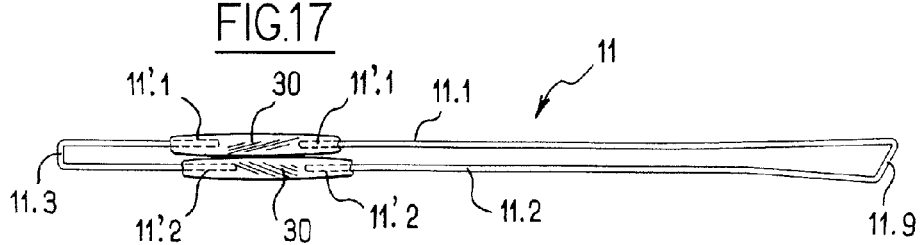
FIGS. 17 and 18 are respectively a side view and a plan view showing a variant of the preceding embodiment in which the main portions of the side branch are essentially parallel to each other, and are connected together by a unitary portion.
Figure 18:
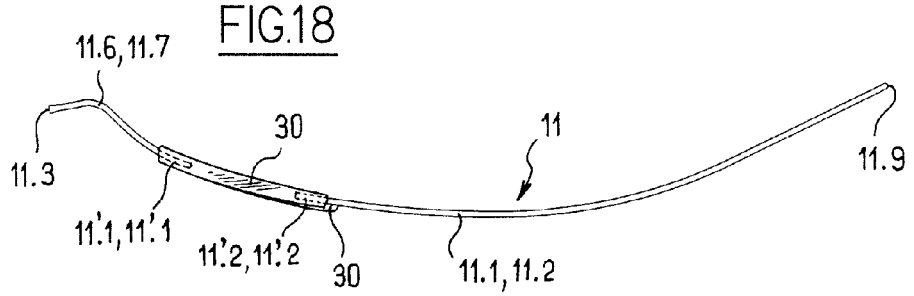

FIGS. 17 and 18 show a variant of the preceding embodiment in which the main portions 11.1, 11.2 of each side branch are essential mutually parallel, thereby giving a distance between the main portions that is essentially constant, said portions being interconnected by a unitary rear portion 11.9.

Figure 19:
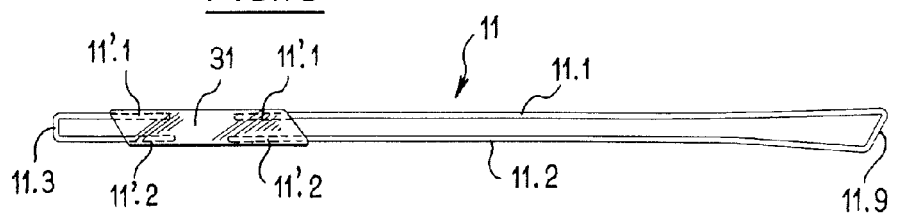
FIGS. 19 and 20 are respectively a side view and a plan view showing another variant in which a hinge block common to both main portions is provided to form the hinge.
Figure 20:
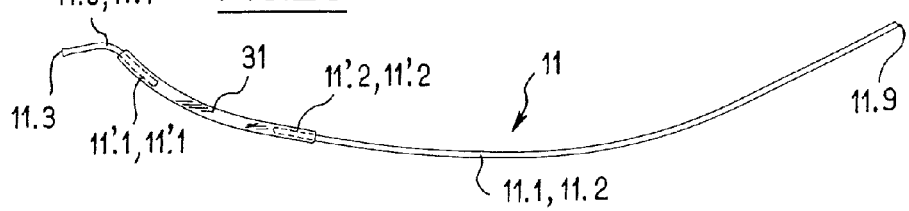

In FIGS. 19 and 20, there can be seen yet another variant in which a hinge element is provided that is constituted by a flexible block 31 that is common to both main portions 11.1, 11.2, and in which the interrupted ends 11'1, 11'2 of the main portions are embedded.

The flexible block 30 or 31 described above could naturally be replaced by a traditional mechanical hinge secured to the interrupted ends 11'1, 11'2 (variant not shown herein).

When the main portions 11.1, 11.2 are interrupted in this way by a hinge-forming element, the advantage of the side branches being made in unitary manner is lost, however greater flexibility is obtained concerning the hinge because of the presence of the flexible blocks 30, 31 that are preferably made of plastics material. For the variant of FIGS. 15 and 16, each side branch is constituted by three metal components united with one another by the flexible blocks 30. In contrast, in the embodiments of FIGS. 17 and 18, and FIGS. 18 and 20, there are only two metal components making up each side branch.

In FIGS. 21 and 22, there can be seen another variant of eyeglasses of the invention, in which the main portions 11.1, 11.2 forming each side branch 11 are no longer superposed as in the above-described embodiments, but are juxtaposed, then passing through associated through holes 21, 22 in the lens V that are juxtaposed in the same manner. Specifically, the juxtaposition is horizontal, i.e. the central portion 11.3 extends horizontally, however provision could be made for the central portion 11.3 to extend in an oblique direction (variant not shown herein). Paradoxically, such an arrangement of the side branches does not impair in any way their flexibility in the directions in which they are folded, with this being due to the fineness and the great flexibility of each component wire. The juxtaposed rear ends are embedded in the same manner in a semirigid sleeve 12. The arrangement with juxtaposition does not in any way modify the above-described clamping and anti-rotation functions which are provided in each of the juxtaposed holes 21, 22 with a flexible bushing 15 being interposed in each of them.

Figure 23:
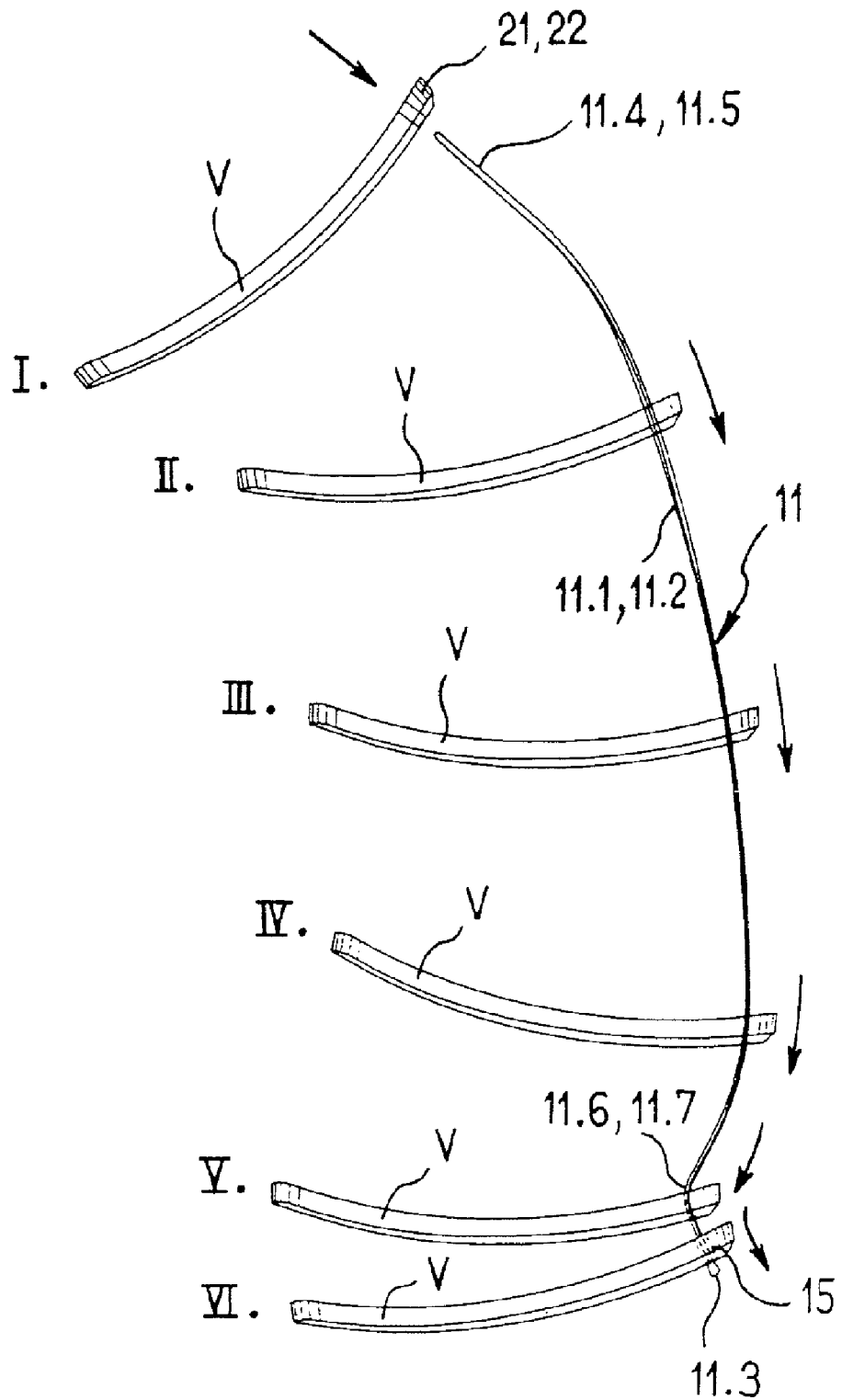
FIG. 23 is a diagrammatic view showing the various relative positions between a side branch having superposed main portions and the corresponding lens while the branch is being threaded from the front face of the lens.

FIG. 23 shows the process whereby a side branch is put into place, the branch shown having main portions that are superposed, which process is performed manually merely by simultaneously threading the two main portions 11.1, 11.2 of said side branch through from the front face of the corresponding lens V. This figure naturally corresponds to the side branch 11 being branch constituted by a single metal part that is deformable in bending without any hinge.

This figure shows the various relative positions between the lens and the two superposed main portions 11.1, 11.2 of the side branch 11.

In position I, the tips of the ends 11.4 and 11.5 face the superposed through holes 21, 22 so as to be ready to be threaded therein.

Positions II, III, IV, and V correspond to successive positions during threading, with different fractions of the main portions 11.1, 11.2 of the wire side branch 11 passing through the superposed through holes 21, 22 until the connection end is reached. The last stage of the movement, which occurs when the lens V has gone past the bends 11.6, 11.7 in the main portions 11.1, 11.2 enables the bushing 15 (as previously put into place) to be inserted in the superposed through holes 21, 22 in the lens V so as to reach the final position VI merely by rectilinear sliding until the front portion 11.3 comes into the direct vicinity of the front face of the lens V.

It can thus be seen that each side branch 11 is mounted quickly and easily without the help of any tools. Thereafter it suffices to put into place either the semirigid sleeve 12 or the flexible sheath 12' or 12" as described above.

If it is subsequently desired to take the assembly apart, it suffices to proceed in the opposite manner, thereby enabling the side branch to be changed while conserving the same lens, or vice versa.

Provision could naturally be made in a variant for the flexible clamping bushings 15 to be placed in the superposed holes 21, 22 in the lens V prior to threading them on the main portions 11.1, 11.2 of the side branch 11, however experience tends to show that premounting the two bushings 15 on the main portions 11.1, 11.2 facilitates the operation. The clamping bushings 15 are preferably made of polyamide 6 or of silicone, these materials also being transparent so as to be more discreet.

If the side branch has main portions 11.1, 11.2 that are juxtaposed (as shown in FIGS. 21 and 22), then the process of threading it in the through holes 21 and 22 (now juxtaposed) is exactly the same as that described above for a side branch having main portions that are superposed.

When the two main portions 11.1, 11.2 of each side branch 11 are interrupted by a hinge-forming element (flexible block 30 or 31), the C-shaped front portion is naturally put into place in the manner described above, after which the interrupted ends are embedded in the corresponding flexible block 30 or 31 so as to make the final assembly of the side branch.

This provides a structure that is both simple and easy and quick to put into place without using any tools.

The invention is not limited to the embodiments described above, but on the contrary covers any variant using equivalent means to reproduce the essential characteristics specified above.

While the present invention has been illustrated and described with respect to a particular embodiment thereof, it should be appreciated by those of ordinary skill in the art that various modifications to this invention may be made without departing from the spirit and scope of the present invention.

What is claimed is:

1. Rimless eyeglasses comprising a bridge interconnecting two lenses, and two side branches connected to respective side zones of the corresponding lenses, wherein each side branch essentially presents a wire structure comprising two main portions extending rearwards from the lens and meeting at the rear end of said branch, said main portions extending forwards, passing through two through holes in the lens, and being connected together in the vicinity of the front face of said lens by a front portion, a flexible bushing being interposed in each through hole in order to clamp the associated main portion so as to hold the side branch in place on the corresponding lens.

2. The eyeglasses according to claim 1, wherein the two main portions forming each side branch are superposed, passing via two through holes in the lens that are superposed, the front portion of said side branch then extending vertically.

3. The eyeglasses according to claim 1, wherein the two main portions forming each side branch are juxtaposed, passing via two through holes in the lens that are juxtaposed, the front portion of said side branch then extending horizontally or in an oblique direction.

4. The eyeglasses according to claim 1, wherein each side branch is constituted by a single piece of metal that is deformable in bending without a hinge, and having its two free ends meeting in an element fitted thereon.

5. The eyeglasses according to claim 4, wherein the fitted element is a semirigid sleeve in which the two free ends of the side branch are embedded.

6. The eyeglasses according to claim 4, wherein the fitted element is a flexible sheath clamping together the two free ends of the side branch.

7. The eyeglasses according to claim 6, wherein the flexible sheath extends forwards as far as the rear face of the corresponding lens so as to cover the two superposed main portions.

8. The eyeglasses according to claim 6, wherein the flexible sheath is made of heat-shrink plastics material, and it is heat-shrunk on the portions concerned of the side branch.

9. The eyeglasses according to claim 1, wherein the two main portions of each side branch are interrupted by a hinge-forming element.

10. The eyeglasses according to claim 9, wherein the hinge-forming element is a flexible block belonging to each main portion, with the interrupted ends of said main portion are being embedded therein.

11. The eyeglasses according to claim 10, wherein the two main portions are connected together by a unitary rear portion.

12. The eyeglasses according to claim 10, wherein the two main portions meet in an element that is fitted thereon, such as a sleeve or a flexible sheath.

13. The eyeglasses according to claim 9, wherein the hinge-forming element is a flexible block common to both main portions, with the interrupted ends of said main portions being embedded therein.

14. The eyeglasses according to claim 1, wherein the two main portions of each side branch are spaced apart by a distance that decreases continuously going rearwards away from the lens.

15. The eyeglasses according to claim 14, wherein the distance at the rear face of the lens lies essentially in the range 4h to 20h, where h is the height or the diameter of the wire element constituting the main portions.

16. The eyeglasses according to claim 1, wherein the two main portions of each side branch are spaced apart by a distance that is essentially constant going rearwards away from the lens.

17. The eyeglasses according to claim 1, wherein the main portions of each side branch are made from a metal wire that is flattened in a vertical plane behind the lens so as to increase the flexibility of said side branch in the directions in which the side branch is folded.

18. The eyeglasses according to claim 17, wherein each main portion presents at least one spike projecting from its portion that passes through the associated through hole in the lens, said at least one spike becoming anchored in the flexible clamping bushing when said main portion is in place.

19. The eyeglasses according to claim 17, wherein each main portion extends away from the lens in rectilinear manner over a distance that is not less than the thickness of the lens, to a permanent bend that forms an obtuse angle with the fraction of said portion that extends beyond said distance.

20. The eyeglasses according to claim 17, the metal wire constituting the front portion of each side branch is likewise flattened, but in the plane of the front face of the lens.

21. The eyeglasses according to claim 17, wherein the metal wire is a titanium wire having a round section that is locally flattened in its front portion.

22. The eyeglasses according to claim 1, wherein each flexible clamping bushing is a fitting that is inserted in the corresponding hole in the lens, said bushing presenting a collar at its front end that comes to bear against the front face of the lens.

* * * * *